Patented Feb. 10, 1953

2,628,245

UNITED STATES PATENT OFFICE 2,628,245

TRIALKYLSILYLADIPIC ACID

John L. Speier, Jr., Pittsburgh, Pa., assignor to Dow Corning Corporation, Midland, Mich., a corporation of Michigan No Drawing. Application December 7, 1950, Serial No. 199,729

3 Claims. (Cl. 260—448.2)

This invention relates to trialkylsilyladipic acids and the preparation thereof.

The preferred compounds of this invention have the general formula $R_3SiCH(CH_2CH_2COOH)(CH_2COOH)$, in which R is an alkyl radical such as methyl, ethyl, propyl, and octadecyl.

It is an object of this invention to provide novel and useful organosilicon compounds of the above general formula, and a method for their preparation.

The above compounds are prepared by oxidizing a trialkylsilylcyclohexanol, preferably with nitric acid.

The trialkylsilylcyclohexanols employed in this invention may be prepared by hydrogenating a trialkylsilylphenoxytrialkylsilane in the presence of Raney nickel and hydrolyzing the reaction product, as is claimed and disclosed in greater detail in my copending application Serial No. 199,728 filed concurrently herewith. The trialkylsilylphenoxytrialkylsilane used in the hydrogenation reaction may be prepared by reacting a trialkylhalophenoxysilane, a trialkylhalosilane, and an alkali metal as is disclosed in my copending application Serial No. 185,514, filed September 18, 1950.

The products of the present invention are useful as intermediates in the preparation of new and useful organo-silicon resins and plastics. They may be reacted with a diamine, such as hexamethylenediamine, to produce new types of polyamide resins.

The following example is illustrative only and is not to be construed as limiting the invention.

Example

A mixture of 65 grams of nitric acid (specific gravity 1.42), 28.5 grams water, and 1 gram of ammonium vanadate was heated to 90° C. 40 grams of p-trimethylsilylcyclohexanol (a mixture of the cis- and trans-isomers) was slowly added to the oxidizing mixture, evolving oxides of nitrogen. When the addition was complete the reaction mixture was stirred until no further evolution of oxides of nitrogen was apparent and then cooled. Filtration of the reaction mixture gave a crystalline product which was washed with cold water. The product obtained was trimethylsilyladipic acid, $(CH_3)_3SiCH(CH_2CH_2COOH)(CH_2COOH)$, having a melting point of 85° to 86.5° C. and a neutral equivalent of 109.4. The calculated neutral equivalent is 109.2.

That which is claimed is:

1. A compound having the general formula $R_3SiCH(CH_2CH_2COOH)(CH_2COOH)$ in which R is an alkyl radical.
2. Trimethylsilyladipic acid.
3. A compound having the general formula $(CH_3)_3SiCH(CH_2CH_2COOH)(CH_2COOH)$.

JOHN L. SPEIER, Jr.

No references cited.